United States Patent
Casey et al.

(10) Patent No.: US 6,502,300 B1
(45) Date of Patent: Jan. 7, 2003

(54) METHOD AND APPARATUS FOR BALANCING A ROTARY ACTUATOR BY MODIFYING WEIGHT DISTRIBUTION CHARACTERISTICS OF THE ROTARY ACTUATOR FOR LOCATING AN INSTALLED HEAD STACK ASSEMBLY PORTION CENTER-OF-GRAVITY ALONG A PIVOT AXIS

(75) Inventors: Shawn E. Casey, San Jose, CA (US); Raffi Codilian, Irvine, CA (US); Roger G. Davis, San Jose, CA (US); Jorge Haro, Stockton, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 287 days.

(21) Appl. No.: 09/630,070
(22) Filed: Jul. 31, 2000
(51) Int. Cl.$^7$ ............................................... G11B 5/127
(52) U.S. Cl. .................. 29/603.03; 29/603.04; 29/901; 29/593
(58) Field of Search ................. 29/603.03, 603.04, 29/901, 593

(56) References Cited

U.S. PATENT DOCUMENTS

| 4,772,974 A | 9/1988 | Moon et al. |
|---|---|---|
| 5,798,885 A | 8/1998 | Saiki et al. |
| 5,936,803 A | * 8/1999 | Berding ............... 360/244.8 |

FOREIGN PATENT DOCUMENTS

| JP | 57094629 A | * 6/1982 | ............ G01M/1/30 |
|---|---|---|---|
| JP | 57193954 A | * 11/1982 | ........... H02K/15/16 |

\* cited by examiner

*Primary Examiner*—Cheryl J. Tyler
*Assistant Examiner*—Emmanuel Sayoc
(74) *Attorney, Agent, or Firm*—W. Chris Kim, Esq.; Milad G. Shara, Esq.; Stetina Brunda Garred & Brucker

(57) ABSTRACT

An aspect of the invention can be regarded as a method of balancing a rotary actuator for use in a rotatable head stack assembly (HSA) portion in a disk drive. The rotary actuator has a pivot axis, and the rotatable HSA portion has an installed HSA portion center-of-gravity. The method provides for deetermining a desired rotary actuator center-of-gravity location for locating the installed HSA portion center-of-gravity along the pivot axis for mitigating acceleration of the rotary actuator about the pivot axis due to external linear acceleration experienced by the disk drive during a track-follow operation. The method further provides for measuring weight distribution characteristics of the rotary actuator to determine an actual rotary actuator center-of-gravity. The method further provides for selectively modifying weight distribution characteristics of the rotary actuator to locate the actual rotary actuator center-of-gravity at the desired rotary actuator center-of-gravity location.

5 Claims, 7 Drawing Sheets

METHOD AND APPARATUS FOR BALANCING A ROTARY ACTUATOR BY MODIFYING WEIGHT DISTRIBUTION CHARACTERISTICS OF THE ROTARY ACTUATOR FOR LOCATING AN INSTALLED HEAD STACK ASSEMBLY PORTION CENTER-OF-GRAVITY ALONG A PIVOT AXIS

CROSS-REFERENCE TO RELATED APPLICATIONS

The present patent application is related to U.S. patent application Ser. No. 09/608,250 filed on Jun. 30, 2000, entitled "DISK DRIVE INCLUDING BALANCE-COMPENSATED HEAD STACK ASSEMBLY PORTION HAVING INSTALLED HEAD STACK ASSEMBLY PORTION CENTER-OF-GRAVITY DISPOSED ALONG PIVOT AXIS," the specification of which is hereby incorporated by reference. The present patent application is further related to U.S. patent application Ser. No. 09/584,837 filed on May 31, 2000, entitled "METHOD OF MAKING BALANCE-COMPENSATED ROTARY ACTUATOR BASED UPON TRACK-FOLLOW PERFORMANCE OF A ROTATABLE TEST HEAD STACK ASSEMBLY PORTION," the specification of which is hereby incorporated by reference.

BACKGROUND OF THE INVENTION

1. Field of the Invention

The present invention relates generally to rotary actuators, and more particularly to method and apparatus for balancing a rotary actuator by selectively modifying weight distribution characteristics of the rotary actuator for locating an installed head stack assembly portion center-of-gravity along a pivot axis.

2. Description of the Prior Art

A representative disk drive incorporating the structures referred to herein is taught, for example, in U.S. Pat. No. 5,953,183 to Butler et al., entitled "HEAD STACK ASSEMBLY FOR A MAGNETIC DISK DRIVE WITH A PASS-THROUGH FLEX CIRCUIT CABLE," and is incorporated herein by reference.

A disk drive includes a disk having a track, a disk controller for generating a servo control signal, and a head stack assembly. The head stack assembly includes a rotary actuator and a flex cable assembly. The rotary actuator includes an actuator body portion, a pivot axis extending through the actuator body portion, and a head extending from the actuator body portion. The rotary actuator is responsive to the servo control signal for positioning the head over the track.

The flex cable assembly includes a flex cable, a flex clamp and electrical components (e.g., an integrated circuit containing a pre-amplifier). The flex cable is interposed between a printed circuit board assembly and the integrated circuit. The head stack assembly includes a rotatable head stack assembly (HSA) portion which includes a rotatable flex cable portion for receiving the servo control signal and the rotary actuator. As such, the rotatable HSA portion includes those subcomponents of the head stack assembly which are configured to rotate about the pivot axis.

It is known that gravitational effects on a mass of the attached flex cable portion and other components of the head stack assembly produce a torque on the rotary actuator about an axis which extends perpendicularly from the pivot axis. Such a torque is undesirable as the rotary actuator becomes susceptible to an external acceleration torque being applied to the rotary actuator about the pivot axis when the disk drive is exposed to an external linear acceleration. The external linear acceleration may be due to vibration or shock for example. The resulting external acceleration torque results in positional errors of the heads relative to the desired tracks (off-track errors) being introduced into the system during operation. Off-track errors are particularly undesirable for a number or reasons. In particular, such errors directly impact the overall seek time of the disk drive because the settling time will increase. Further, the data transfer rate will decease due to the off-track errors. Moreover, as the tracks per inch (TPI) specification of disk drives increase, the system sensitivity of such off-track errors likewise increases.

There have been attempts to mitigate against gravitational effects of the mass of the flex cable and other components which produce a torque applied to the rotary actuator. In this regard, a known methodology includes estimation of which portion of the flex cable is associated with a gravitational related torque applied to the rotary actuator related to the mass of the flex cable, in addition to the mass other components of the head stack assembly. For example, half of the flex cable may be a rough estimate. The prior art method would call for cutting the flex cable at the estimated location and removing the rotary actuator with the severed portion of the flex cable. The center of gravity of the rotary actuator with the severed portion of the flex cable would then be determined by mechanical means. Using such center of gravity information, the rotary actuator design would then be modified so as to attempt to locate the center of gravity of the rotary actuator with the severed portion of the flex cable at the pivot axis. Such prior art rotary actuator designs have proven to include a high degree of off-track errors associated with external linear acceleration acting on the disk drive. Accordingly, there is a need in the art for a method and apparatus for making an improved rotary actuator.

SUMMARY OF THE INVENTION

An aspect of the invention can be regarded as a method of balancing a rotary actuator for use in a rotatable head stack assembly (HSA) portion in a disk drive. The rotary actuator has a pivot axis, and the rotatable HSA portion has an installed HSA portion center-of-gravity. The method provides for determining a desired rotary actuator center-of-gravity location for locating the installed HSA portion center-of-gravity along the pivot axis for mitigating acceleration of the rotary actuator about the pivot axis due to external linear acceleration experienced by the disk drive during a track-follow operation. The method further provides for measuring weight distribution characteristics of the rotary actuator to determine an actual center-of-gravity of the rotary actuator. The method further provides for selectively modifying weight distribution characteristics of the rotary actuator to locate the actual center-of-gravity of the rotary actuator at the desired rotary actuator center-of-gravity location.

In an embodiment of the present invention, the step of selectively modifying weight distribution characteristics of the rotary actuator may include adding a balancing mass to the rotary actuator. Further, such adding of the balancing mass may include dispensing a material upon the rotary actuator to locate the actual center-of-gravity of the rotary actuator at the desired rotary actuator center-of-gravity location. The material has a first liquid phase when dispensed and has a second solid phase subsequent to being dispensed. Further, the step of selectively modifying weight distribution characteristics of the rotary actuator may include removing a mass from the rotary actuator. Such removing of the mass may include drilling the rotary actuator.

Another aspect of the invention can be regarded as a rotary actuator balancing system for use with a rotary actuator. The balancing system is provided with a support plate having upper and lower sides thereof. The upper side is sized and configured to receive the rotary actuator thereon in a weight supporting relationship therewith. The balancing system is further provided with a force measurement device in mechanical communication with the support plate. The force measurement device is sized and configured to sense weight distribution characteristics of the rotary actuator when supported by the support plate for determining an actual rotary actuator center-of-gravity of the rotary actuator. The balancing system is further provided with a mass modifying device sized and configured to modify weight distribution characteristics of the rotary actuator to locate the actual rotary actuator center-of-gravity at a desired rotary actuator center-of-gravity location. The balancing system is further provided with a mass modifying device support sized and configured to selectively move the mass modifying device with respect to the support plate. The mass modifying device support is disposed in mechanical communication with force measurement device.

In an embodiment of the present invention, the force measurement device includes three strain gauges. Further, the lower side of the support plate includes three datum points, and the three strain gauges are sized and configured to respectively contact the three datum points in mechanical communication therewith. The mass modifying device may be a material dispensing unit sized and configured to add mass to the rotary actuator. The material dispensing unit may be sized and configured to dispense a material. The material may have a first liquid phase when dispensed and have a second solid phase subsequent to being dispensed. Further, the mass modifying device may be a material removal unit sized and configured to remove mass from the rotary actuator. The material removal unit may be a drill. The rotary actuator may be provided with a bore extending therethrough. The support plate may include a bore datum post extending from the upper side thereof. The bore datum post is sized and configured to extend through the bore of the rotary actuator for locating the rotary actuator relative to the support plate. Further, the support plate may have an angular orientation feature extending from the upper side thereof. The angular orientation feature is sized and configured to contact the rotary actuator for locating the rotary actuator relative to the support plate. In addition, the rotary actuator may have a coil portion and a tang extending therefrom. The angular orientation feature may be a tang registration pin extending from the upper side of the support plate. The tang registration pin is sized and configured to contact the tang of the rotary actuator for locating the rotary actuator relative to the support plate. The support plate may include an elevation location feature extending therefrom. The elevation location feature is sized and configured to contact the rotary actuator in spaced relation from the upper side of the support plate for locating the rotary actuator relative to the support plate.

BRIEF DESCRIPTION OF THE DRAWINGS

FIG. 6a is an enlarged top view of a HSA portion which includes the rotary actuator of FIG. 5a;

FIG. 9a is a top view of the support plate of the rotary actuator balancing system of FIG. 8a;

FIG. 10 is a side view of the support plate of FIGS. 9a.

DESCRIPTION OF THE PREFERRED EMBODIMENTS

Figure 1:
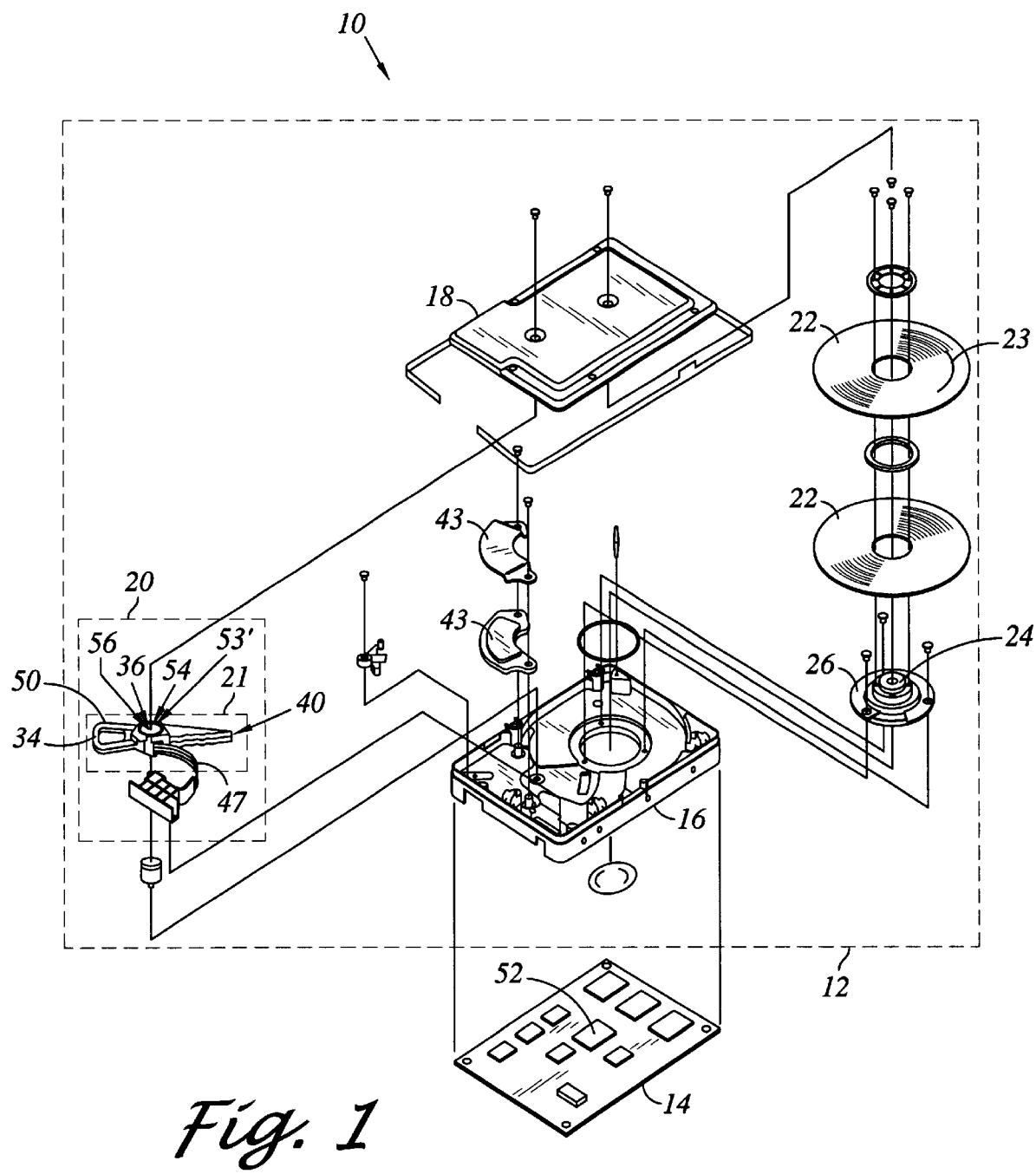
FIG. 1 is an exploded view of a disk drive including a rotatable head stack assembly (HSA) portion having a rotary actuator as constructed in accordance with an aspect of the present invention.

Referring now to the drawings wherein the showings are for purposes of illustrating preferred embodiments of the present invention only, and not for purposes of limiting the same, FIGS. 1–4, 5a, 5b, 6a, 6b, 7, 8a, 8b, 9a, 9b and 10 illustrate the method and apparatus for balancing a rotary actuator in accordance with the present invention.

Referring now to FIG. 1 there is depicted a disk drive 10 having a disk 22 having a track 23. The disk drive 10 is further provided with a rotatable head stack assembly (HSA) portion 21 which includes a rotary actuator 50. The HSA portion 21 further has an installed HSA portion center-of-gravity 56. The rotary actuator 50 includes an actuator body portion 34, a pivot axis 36 extending through the actuator body portion 34 and a head 40 connected to the actuator body portion 34. A bore 35 extends through the actuator body portion 34 about the pivot axis 36. The rotary actuator 50 is controlled to rotate about the pivot axis 36 for positioning the head 40 over the track 23 during a track-follow operation. Significantly, the rotary actuator 50 is constructed in accordance with the method of an aspect of the present invention as described in detail below. In regard, the rotary actuator 50 is particularly constructed such that the installed HSA portion center-of-gravity 56 is disposed along the pivot axis 36.

The disk drive 10 is further provided with a flex cable 46 having a flex cable portion 47. The flex cable portion 47 is attached to the actuator body portion 34. The rotatable HSA portion 21 includes the flex cable portion 47. The installed HSA portion center-of-gravity 56 is disposed along the pivot axis 36 for mitigating external acceleration applied to the rotary actuator 50 about the pivot axis 36 due to external linear acceleration experienced by the disk drive 10 during the track-follow operation.

The disk drive 10 includes a head disk assembly 12 and a printed circuit board assembly 14. Generally, the printed circuit board assembly 14 includes circuitry for processing signals and controlling operations of the disk drive 10. The head disk assembly 12 includes a housing enclosure having a base 16 and a cover 18, a head stack assembly 20, and the magnetic disk 22 coaxially mounted in a stack upon a spindle 24 driven by a spindle motor 26 fixed to the base 16. As used herein, the term disk 22 denotes both the singular and the plural. In operation the spindle motor 26 rapidly rotates the disks 22 in a single direction about a disk axis of rotation. Each disk 22 has a disk surface. Data on the disks 22 are written in substantially parallel concentric tracks 23. As used herein, the term track 23 denotes both the singular and the plural. In addition, servo sectors are distributed about the disk surface for providing radial positional information in reference to the tracks 23 and the disk axis of rotation.

The disk drive 10 further includes a disk controller 52 for generating a servo control signal. The HSA portion 21 includes a rotatable flex cable portion 47 for passing the servo control signal to the rotary actuator 50. The BC rotary actuator 50 is responsive to the servo control signal for positioning the head 40 over the track 23.

Figure 2:
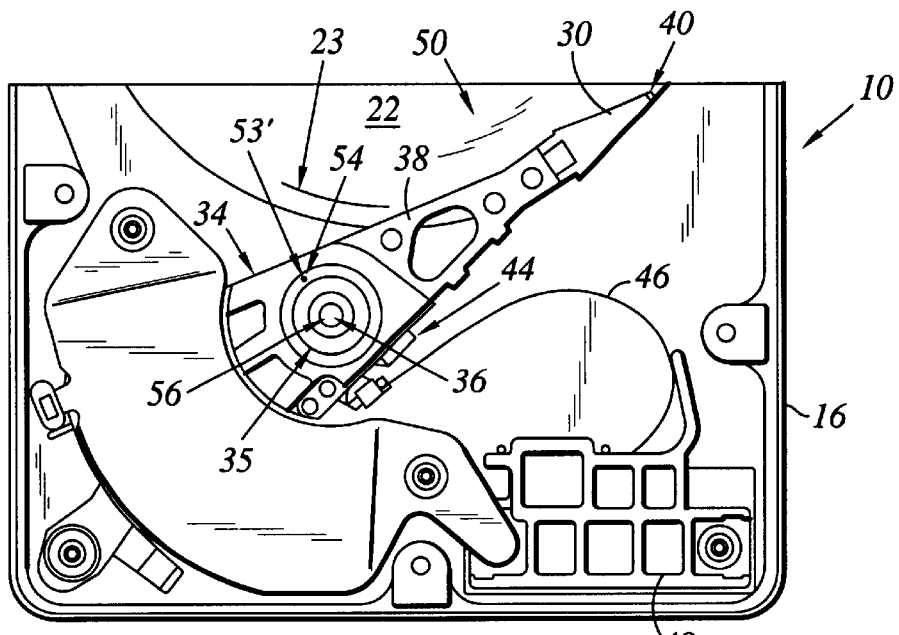
FIG. 2 is a partial top view of the disk drive of FIG. 1 as shown in assembled form with a partial view the rotatable HSA portion and the rotary actuator.
Figure 3:
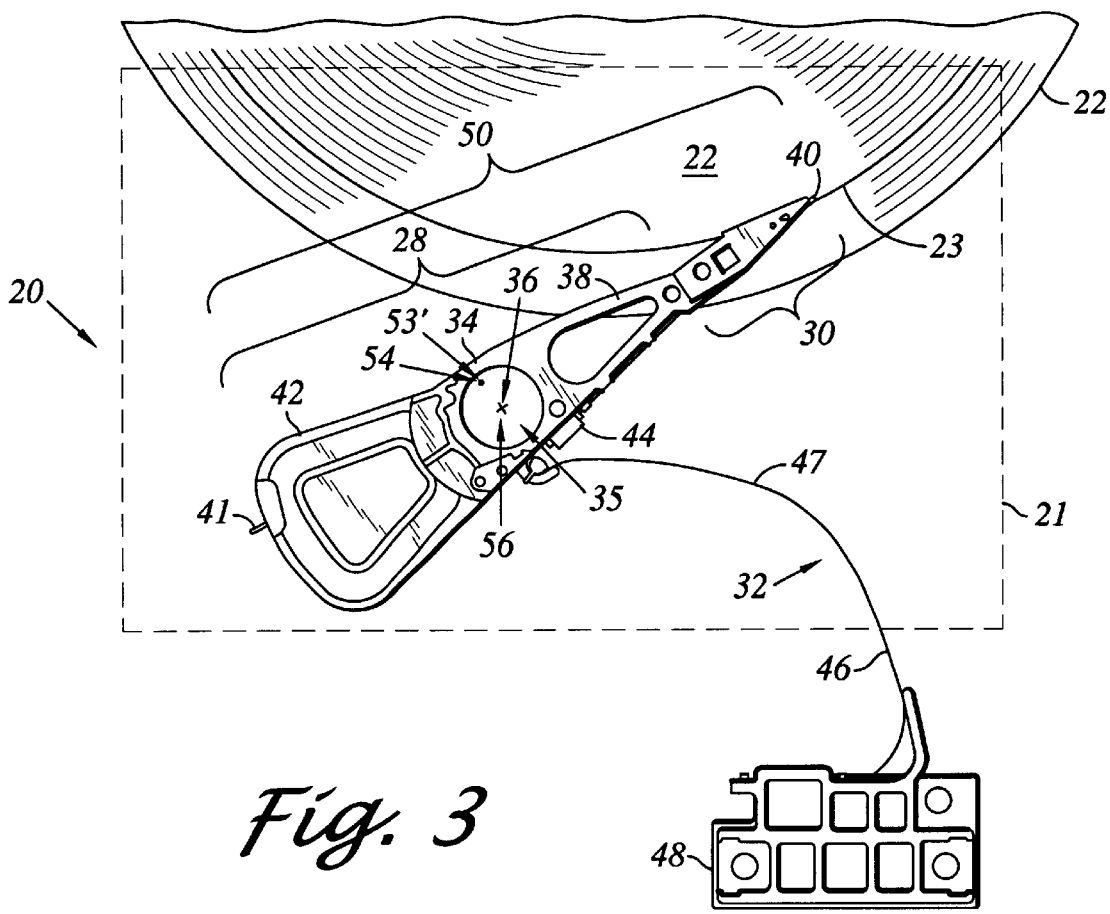
FIG. 3 is an enlarged top view of the rotatable HSA, including the rotatable HSA portion and the rotary actuator, as illustrated in FIG. 1.

Referring now to FIG. 2, there is depicted a top view of the disk drive 10 of FIG. 1 as shown in assembled form with a partial view of the rotatable HSA portion 21 and the rotary actuator 50. Referring now to FIG. 3, there is depicted an enlarged view of the head stack assembly 20 of FIG. 1. The head stack assembly 20 comprises an actuator assembly 28, at least one head gimbal assembly 30 and a flex cable assembly 32. As used herein, the term head gimbal assembly 30, as well as its subcomponents thereof, denote both the singular and the plural. The actuator assembly 28 includes the actuator body portion 34 and the pivot axis 36. An actuator arm 38 extends from the body portion 34 to each disk 22 provided. As used herein the term actuator arm 38 denotes both the singular and the plural. A head gimbal assembly 30 extends from each of the actuator arms 38. Each head gimbal assembly 30 includes a load beam, a gimbal attached to the load beam, and an electromagnetic head 40 supported by the gimbal. As used herein the term head 40 denotes both the singular and the plural. The head gimbal assembly 30 is sized and configured to bias the head 40 toward the disk surface. In operation, the actuator assembly 28 is rotated to position the head 40 over the disk surface in a transducing relationship.

The actuator assembly 28 further includes a coil portion 42. The coil portion 42 extends from the actuator body portion 34 in an opposing direction from the head gimbal assemblies 30. The coil portion 42 interacts with a pair of permanent magnets 43 mounted the housing enclosure 16 to form a voice coil motor for rotating the actuator assembly 28 about the pivot axis 36. Thus, the voice coil motor controllably positions the head 40 relative to the disk surface. Preferably, a tang 41 extends from the coil portion 42 which is utilized to park the rotary actuator 50 in place with respect to angular orientation. In addition, preferably a surface 45 is disposed interior and across the coil portion 42. The printed circuit board assembly 14 is disposed in electrical communication with the head 40. Electrical connections extend from each of the heads 40 along the attached gimbals and load beams and commonly terminate at an integrated circuit 44 mounted to a side of the body portion 34 of the actuator assembly 28. The integrated circuit 44 includes a pre-amplifier for increasing electrical signals sent to and received from the head 40. In addition, the integrated circuit 44 is disposed in electrical communication with the coil portion 42 for transmitting current thereto. The flex cable assembly 32 includes the flex cable 46, a flex clamp 48 and electrical components (e.g., the integrated circuit 44 containing a pre-amplifier). As mentioned above, the flex cable 46 includes the flex cable portion 47. The flex cable 46 is interposed between the printed circuit board assembly 14 and the integrated circuit 44.

In operation, the printed circuit board assembly 14 which includes the disk controller 52 for generating a servo control signal which is transmitted to the integrated circuit 44 via the flex cable 46 which in turn is electrically communicated to the coil portion 42. As such, the actuator assembly 28 is rapidly pivoted in a back and forth motion about the pivot axis 36 so as to controllably position the heads 40 adjacent to the selected ones of the tracks on the disk surfaces in response to the servo control signal. Further, the servo control data from servo sectors is read by the heads 40 to generate position error information (a position error signal) which is representative of the positioning of the heads 40 relative to particular tracks 23 during a track-follow operation. Such electrical signal is transmitted to the integrated circuit 44 which in turn transmits a corresponding electrical signal to the printed circuit board assembly 14 via the flex cable 46. The printed circuit board assembly 14 receives the electrical signal and generates a signal which is representative of the read data read from the servo sectors. The printed circuit board assembly 14 uses the position error signal to control the movement of the actuator assembly 28.

In accordance with an aspect of the present invention, there is provided a method of balancing the rotary actuator 50 for use in the rotatable HSA portion 21 in a disk drive 10, the components and operation of which having been described above. The method provides for the step determining 100 a desired rotary actuator center-of-gravity location 54 for locating the installed HSA portion center-of-gravity 56 along the pivot axis 36 for mitigating acceleration of the rotary actuator 50 about the pivot axis 36 due to external linear acceleration experienced by the disk drive 10 during a track-follow operation. Suitable methods of determining the desired rotary actuator center-of-gravity location 54 are disclosed U.S. patent application Ser. No. 09/584,837 filed on May 31, 2000, entitled "METHOD OF MAKING BALANCE-COMPENSATED ROTARY ACTUATOR BASED UPON TRACK-FOLLOW PERFORMANCE OF A ROTATABLE TEST HEAD STACK ASSEMBLY PORTION," the specification of which is hereby incorporated by reference. In addition, the desired rotary actuator center-of-gravity location 54 is further discussed in U.S. patent application Ser. No. 09/608,250 filed on Jun. 30, 2000, entitled "DISK DRIVE INCLUDING BALANCE-COMPENSATED HEAD STACK ASSEMBLY PORTION HAVING INSTALLED HEAD STACK ASSEMBLY PORTION CENTER-OF-GRAVITY DISPOSED ALONG PIVOT AXIS," the specification of which is hereby incorporated by reference.

Figure 4:
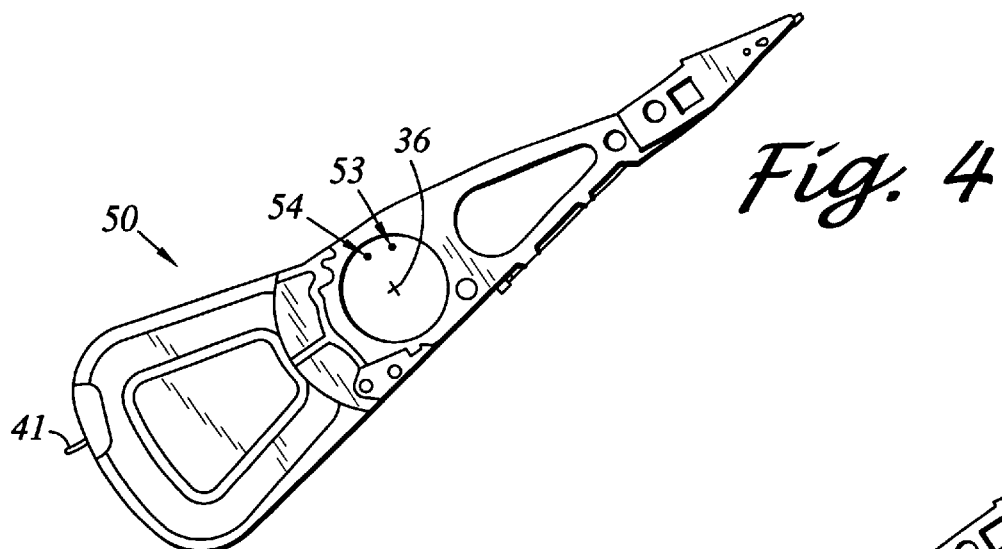
FIG. 4 is an enlarged top view of a rotary actuator prior to having its weight distribution characteristics modified in accordance with an aspect of the present invention.

The method further provides for the step of measuring 110 weight distribution characteristics of the rotary actuator 50 to determine an actual rotary actuator center-of-gravity 53 of the rotary actuator 50 as shown in FIG. 4. The rotary actuator 50 has initial weight distribution characteristics which initially define an actual rotary actuator center-of-gravity 53. A suitable apparatus for determining the actual rotary actuator center-of-gravity 53 is described below as another aspect of the present invention.

The method further provides for the step of selectively modifying 120 weight distribution characteristics of the rotary actuator 50 to locate the actual rotary actuator center-of-gravity 53' of the rotary actuator 50 at the desired rotary actuator center-of-gravity location 54. A suitable apparatus for modifying weight distribution characteristics of the rotary actuator 50 is described below as another aspect of the present invention.

Figure 5A:
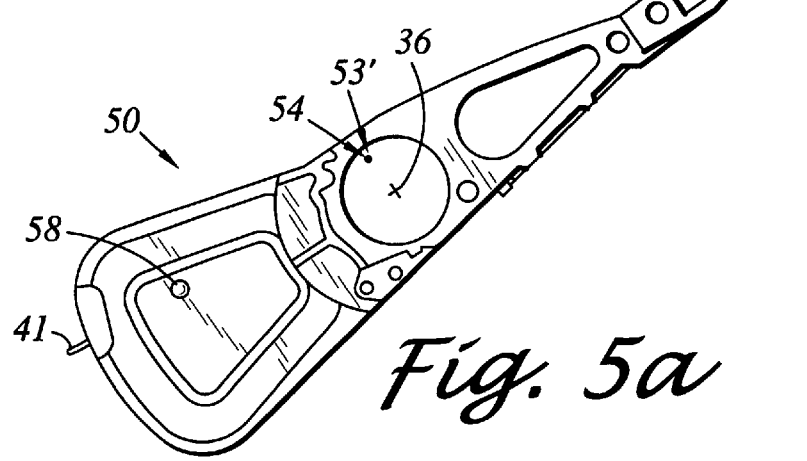
FIG. 5a is an enlarged top view of a rotary actuator after having its weight distribution characteristics modified in accordance with an aspect of the present invention through the addition of a balancing mass.
Figure 5B:
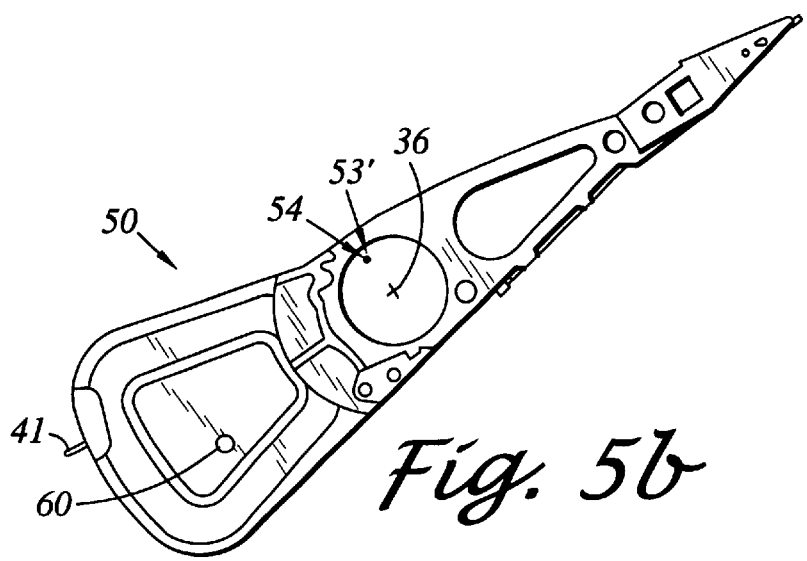
FIG. 5b is an enlarged top view of a rotary actuator after having its weight distribution characteristics modified in accordance with the present invention through the removal of material from the rotary actuator.
Figure 6A:
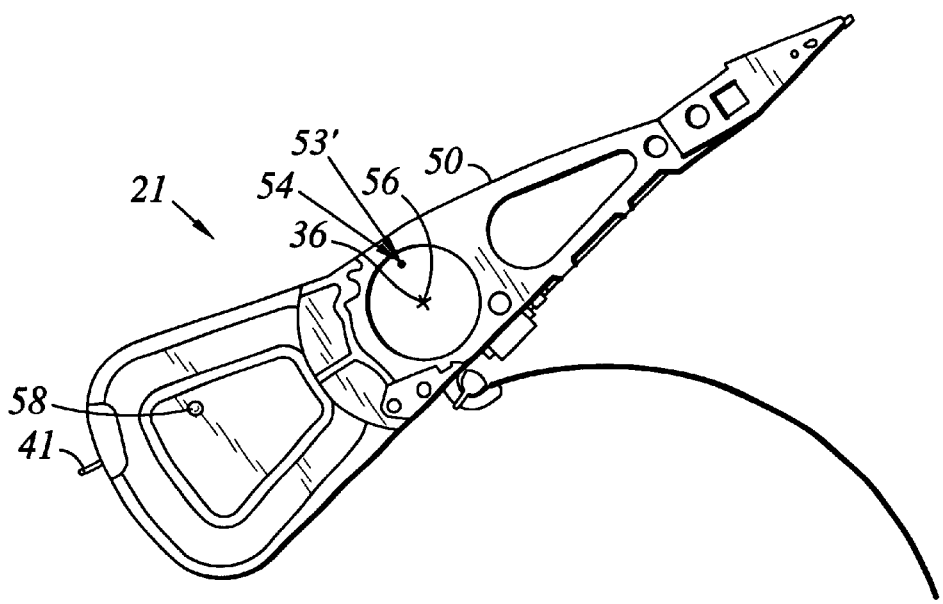

The step of selectively modifying 120 weight distribution characteristics of the rotary actuator may include adding a balancing mass 58 to the rotary actuator 50 as depicted in FIG. 5a. FIG. 6a depicts of the rotary actuator 50 of FIG. 5a as incorporated with the rotatable HSA portion 21. The adding of the balancing mass 58 may include dispensing a material upon the rotary actuator 50 to locate the actual rotary actuator center-of-gravity 53' at the desired rotary actuator center-of-gravity location 54. The material has a first liquid phase when dispensed and has a second solid phase subsequent to being dispensed. Preferably, the material is an adhesive, glue or resin which may be dispensed and subsequently cured. Such cure process may be thermal or ultraviolet in nature for example. Further, it is preferable that such adhesive, glue or resin includes a metal based filler so as to enhance with weight characteristics of such material. One such suitable material is an epoxy adhesive known by the tradename ABLEBOND® 8177 manufactured by Emerson & Cuming.

Figure 6B:
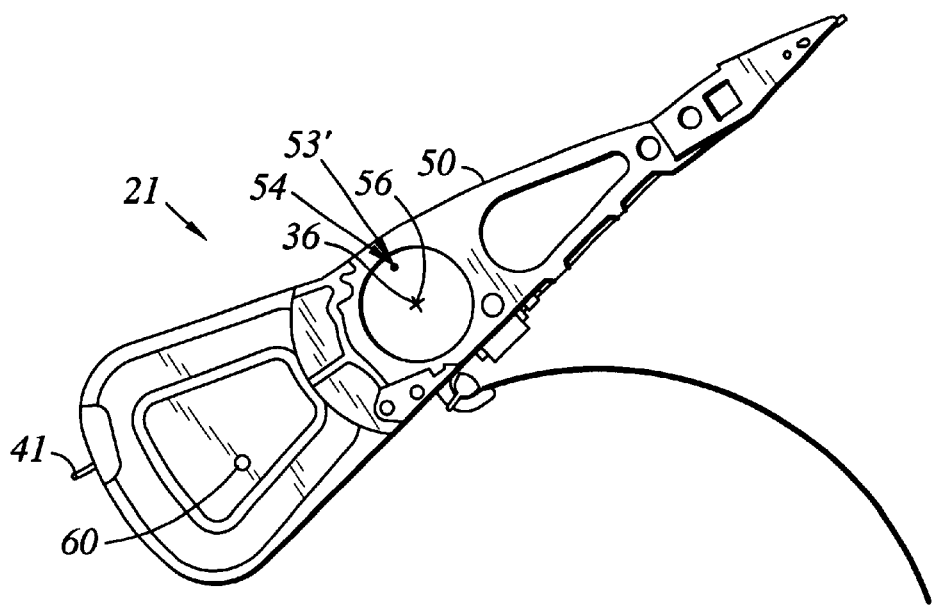
FIG. 6b is an enlarged top view of a HSA portion which includes the rotary actuator of FIG. 5b.
Figure 7:
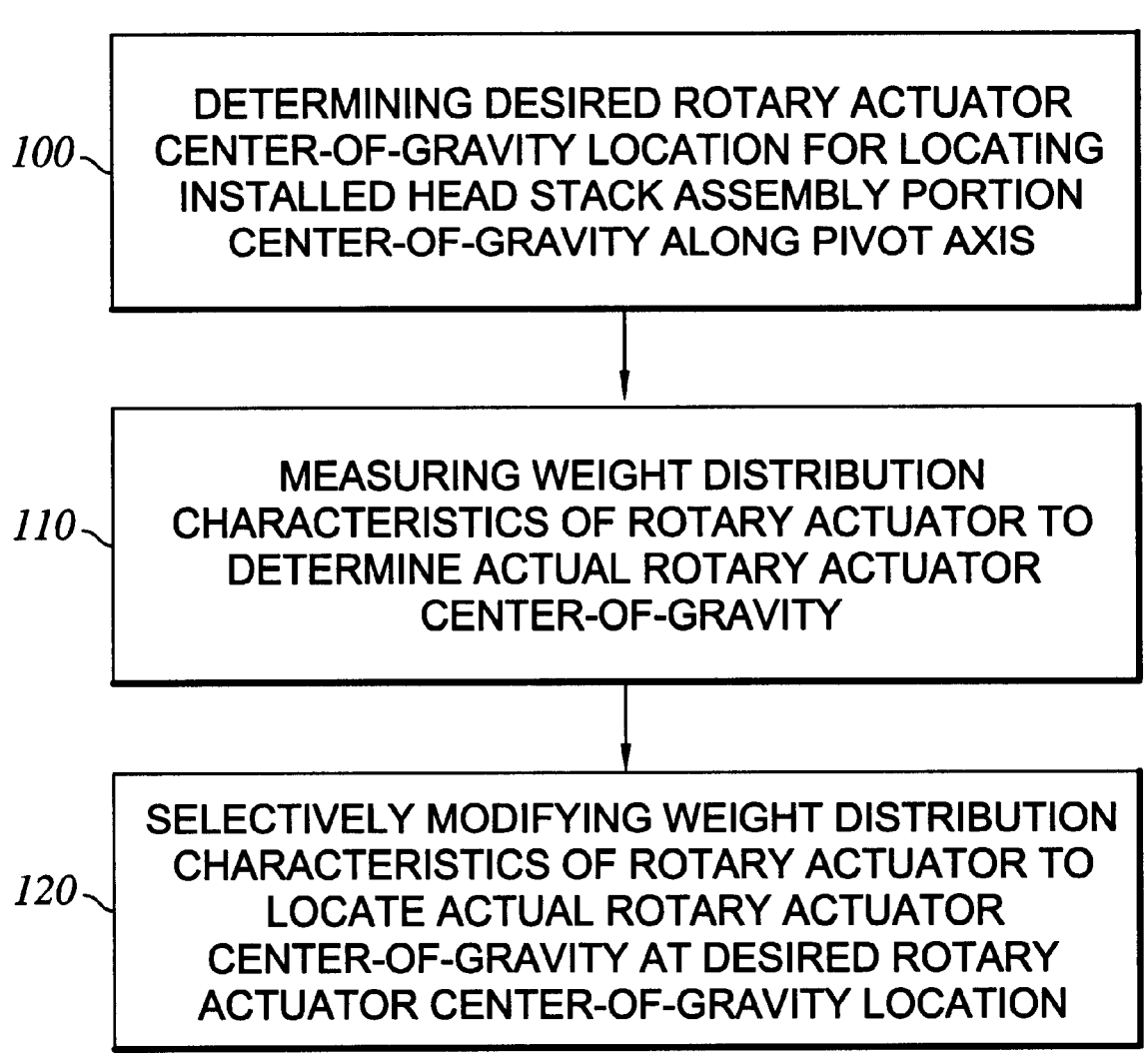
FIG. 7 is a flow diagram of the method of balancing a rotary actuator of an aspect of the present invention.
Figure 8A:
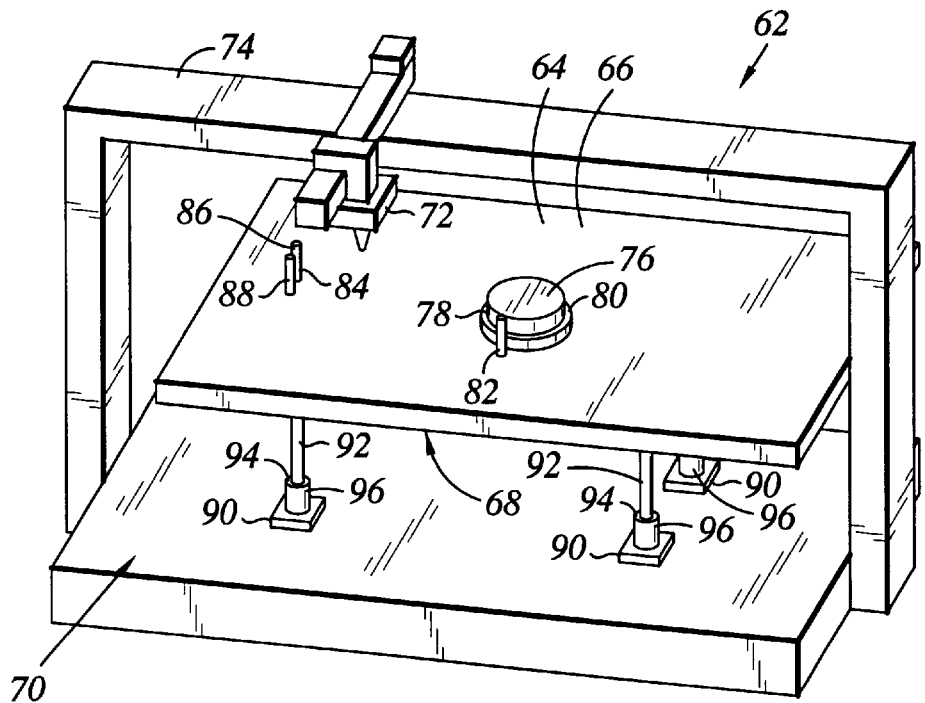
FIG. 8a is a perspective view of the rotary actuator balancing system of an aspect of the present invention.
Figure 8B:
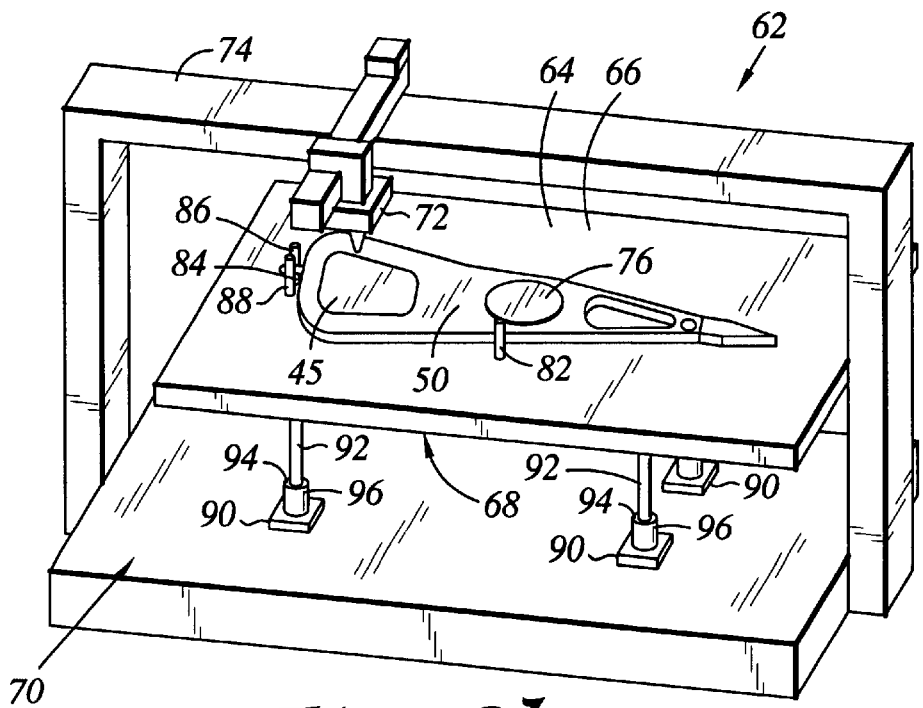
FIG. 8b is a perspective view of the rotary actuator balancing system of FIG. 8a as shown with a rotary actuator in an operable relationship therewith.

It is contemplated that the step of selectively modifying 120 weight distribution characteristics of the rotary actuator includes removing a mass from the rotary actuator 50. In this regard, referring now to FIG. 5b, the rotary actuator 50 is shown with a hole 60 formed therein. FIG. 6b depicts of the rotary actuator 50 of FIG. 5a as incorporated with the rotatable HSA portion 21. The removing of the mass from the rotary actuator 50, as represented by the hole 60, may be accomplished via a drilling process. In this regard, the location and amount of material removed may be reasonably controlled. Such drilling may be mechanical in nature, however, other forms of drilling are contemplated such as laser ablation for example.

As mentioned above, preferably the surface 45 is disposed interior and across the coil portion 42. In this regard, the rotary actuator 50 may be designed such that modifications to the rotary actuator 50 may be accomplished by modifying weight distribution characteristics of the rotary actuator 50 by preferably modifying weight distribution characteristics at the surface 45. This is because such surface 45 may be designed to be relatively free of functional components in comparison to other regions about the rotary actuator 50. Thus, individual rotary actuators 50 based upon a common design may be individually balanced according to the present method by manipulating weight distribution characteristics of the rotary actuator 50 at the surface 45, by adding or removing mass as discussed above.

Referring now more particularly to FIGS. 8a, 8b, 9a, 9b and 10, there is depicted a rotary actuator balancing system 62 for use in balancing the rotary actuator 50. The balancing system 62 is provided with a support plate 64 having upper and lower sides 66, 68 thereof The upper side 66 is sized and configured to receive the rotary actuator 50 thereon in a weight supporting relationship therewith. The balancing system 62 is provided with a force measurement device 70 which is in mechanical communication with the support plate 64. The force measurement device 70 is sized and configured to sense weight distribution characteristics of the rotary actuator 50 when supported by the support plate 64 for determining the actual rotary actuator center-of-gravity 53 and 53' (after balancing) of the rotary actuator 50. The balancing system 62 is further provided with a mass modifying device 72 which is sized and configured to modify weight distribution characteristics of the rotary actuator 50 to locate the actual rotary actuator center-of-gravity 53' at the desired rotary actuator center-of-gravity location 54. The balancing system 62 is further provided with a mass modifying device support 74 which is sized and configured to selectively move the mass modifying device 72 with respect to the support plate 64. The mass modifying device support 74 is disposed in mechanical communication with force measurement device 70. The particular structure and devices used to construct the mass modifying device support 74 for supporting and locating the mass modifying device 72, and therefore the support plate 64 and rotary actuator 50 mounted thereon, may be chosen from those well known to one of ordinary skill in the art and may include for example the use of computer controlled micromotors.

Figure 9A:
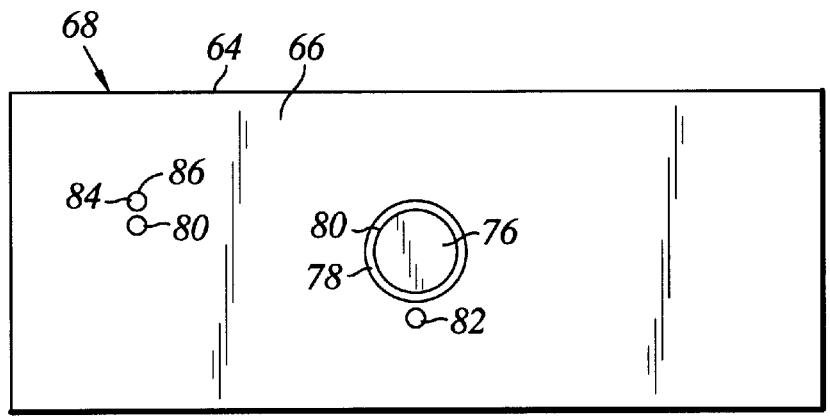
Figure 9B:
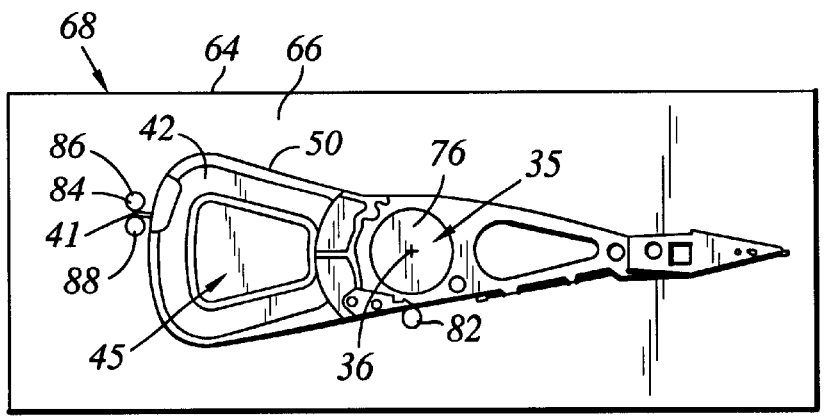
FIG. 9b is a top view of the support plate of FIG. 9a as shown with a rotary actuator in an operable relationship therewith.
Figure 10:
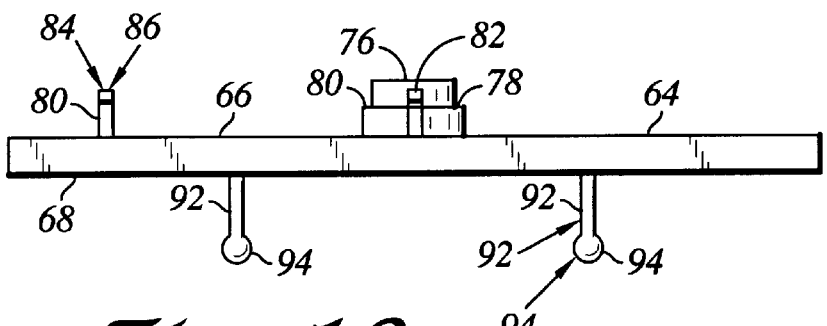

Referring now to FIGS. 9a, 9b and 10, the support plate 64 preferably includes a bore datum post 76 extending from the upper side 66. The bore datum post 76 is cooperatively sized and configured to extend through the bore 35 of the rotary actuator 50 for locating the rotary actuator 50 relative to the support plate 64. A biasing pin 82 may be provided which extends from the support plate 64. The biasing pin 82 is configured to be in mechanical communication with the rotary actuator 50 for securely capturing and positioning the rotary actuator 50 between the biasing pin 82 and the bore datum post 76. In this regard, the biasing pin 82 may be configured so as to have some degree of flexibility in comparison to the bore datum post 76. An O-ring may be provided which is disposed about the biasing pin 82 for this purpose.

In addition, the support plate 64 may include an elevation location feature 78 extending therefrom. The elevation location feature 78 is sized and configured to contact the rotary actuator 50 in spaced relation from the upper side 66 of the support plate 64 for locating the rotary actuator 50 relative to the support plate 64. As such, the elevation location feature 78 may take the form of an annular shoulder portion 80 extending from the bore datum post 76.

Further, the support plate 64 may be provided with an angular orientation feature 84 extending from the upper side 66 thereof. The angular orientation feature 84 is sized and configured to contact the rotary actuator 50 for locating the rotary actuator 50 relative to the support plate 64. As mentioned above, the rotary actuator 50 has a coil portion 42 and a tang 41 extending therefrom. The angular orientation feature 84 may take the form of a tang registration pin 86 extending from the upper side 66 of the support plate 64. The tang registration pin 86 is sized and configured to contact the tang 41 of the rotary actuator 50 for locating the rotary actuator 50 relative to the support plate 64. A tang biasing pin 88 may be provided which extends from the support plate 64. The tang biasing pin 88 is configured to be in mechanical communication with the rotary actuator 50, and in particular, the tang 41, for securely capturing and positioning the tang 41 between the biasing pin 88 and the tang registration pin 86. In this regard, the tang biasing pin 88 may be configured so as to have some degree of flexibility in comparison to the bore datum post 76. An O-ring may be provided which is disposed about the tang biasing pin 88 for this purpose.

The force measurement device 70 may include three strain gauges or force transducers 90. Other devices may be utilized for the force measurement device 70, such as mechanical springs or other mechanisms may be chosen from those which are well known to one of ordinary skill in the art. The lower side 68 of the support plate 64 includes three datum points. The datum points may take the form of location pins 92 extending from the lower side 68 of the support plate 64. The registration pins 92 each preferably have a ball end 94 thereof. The three strain gauges 90 are sized and configured to respectively contact the three datum points, and in particular the three ball ends 94, in mechanical communication therewith. In this regard, attached to and extending from the three strain gauges 90 are three cylindrical supports. The cylindrical supports each preferably have a ball seat end 96 thereof sized and configured to receive the ball ends 94 of the location pins 92.

It is contemplated that values measured by the strain gauges 90 may be processed according to techniques and using hardware/software which are chosen from those which are well known to one of ordinary skill in the art so as to determine the location of the actual rotary actuator center-of-gravity 53 and 53'.

The mass modifying device 72 may take the form of a material dispensing unit sized and configured to add mass to the rotary actuator 50. In this regard, the material dispensing unit is sized and configured to dispense a material. The material has a first liquid phase when dispensed and having a second solid phase subsequent to being dispensed, as discussed above. Additionally, the mass modifying device 72 may take the form of a material removal unit which is sized and configured to remove mass from the rotary actuator 50. In this regard, the material removal unit may be a drill.

We claim:

1. A method of individually balancing rotary actuators each for use in a respective rotatable head stack assembly (HSA) portion in a disk drive, each rotary actuator having a pivot axis, the rotatable HSA portion having an installed HSA portion center-of-gravity, the method comprising:
   a) for each rotary actuator individually determining a desired rotary actuator center-of-gravity location for locating the installed HSA portion center-of-gravity along the pivot axis for mitigating acceleration of the rotary actuator about the pivot axis due to external linear acceleration experienced by the disk drive during a track-follow operation;
   b) for each rotary actuator individually measuring weight distribution characteristics of the respective rotary actuator to determine an actual rotary actuator center-of-gravity; and
   c) for each rotary actuator individually selectively modifying weight distribution characteristics of the respective rotary actuator to locate the actual rotary actuator center-of-gravity at the desired rotary actuator center-of-gravity location.

2. The method of claim 1 wherein step c) of selectively modifying weight distribution characteristics of the rotary actuators includes adding balancing masses to respective ones of the rotary actuators.

3. The method of claim 2 wherein the adding of the balancing masses includes dispensing a material upon respective ones of the rotary actuators to respectively locate the actual rotary actuator center-of-gravity at the desired rotary actuator center-of-gravity location, the material has a first liquid phase when dispensed and has a second solid phase subsequent to being dispensed.

4. The method of claim 1 wherein step c) of selectively modifying weight distribution characteristics of the rotary actuators includes respectively removing masses from respective ones of the rotary actuators.

5. The method of claim 4 wherein the removing of the masses includes drilling respective ones of the rotary actuators.

\* \* \* \* \*